(12) United States Patent
Zhou

(10) Patent No.: US 7,720,106 B2
(45) Date of Patent: May 18, 2010

(54) CIRCUIT FOR SYNCHRONIZING SYMBOLS OF OFDM SIGNAL

(75) Inventor: Liang Zhou, Kawasaki (JP)

(73) Assignee: Fujitsu Limited, Kawasaki (JP)

(\*) Notice: Subject to any disclaimer, the term of this patent is extended or adjusted under 35 U.S.C. 154(b) by 1017 days.

(21) Appl. No.: 10/926,035

(22) Filed: Aug. 26, 2004

(65) Prior Publication Data
US 2005/0220175 A1    Oct. 6, 2005

(30) Foreign Application Priority Data
Mar. 31, 2004 (JP) .............................. 2004-105974

(51) Int. Cl.
*H04J 3/06* (2006.01)
*H04L 7/00* (2006.01)
(52) U.S. Cl. ...................... 370/503; 375/365
(58) Field of Classification Search ................ 370/511, 370/520, 503, 509; 375/366, 354, 355, 365, 375/368
See application file for complete search history.

(56) References Cited

U.S. PATENT DOCUMENTS

| | | | |
|---|---|---|---|
| 6,246,735 B1 * | 6/2001 | Sano et al. ................... | 375/364 |
| 7,072,693 B2 * | 7/2006 | Farlow et al. ................ | 375/299 |
| 7,257,165 B2 * | 8/2007 | Gardner ....................... | 370/516 |
| 7,336,738 B2 | 2/2008 | Wakamatsu | |
| 2003/0161428 A1 * | 8/2003 | Garrett et al. ................ | 375/368 |

FOREIGN PATENT DOCUMENTS

| | | |
|---|---|---|
| JP | 11-163824 | 6/1999 |
| JP | 11-168446 | 6/1999 |
| JP | 2000-165338 | 6/2000 |
| JP | 2000-209179 | 7/2000 |
| JP | 2003-069546 | 3/2003 |

OTHER PUBLICATIONS

Tandai et al., "A Study of Frame Synchronization Method for IEEE802.11a System", Proceedings of the 2002 IEICE General Conference, Communication 1, p. 704 (Mar. 7, 2002).
Japanese Office Action dated Oct. 20, 2009, 3 pages.

\* cited by examiner

*Primary Examiner*—Aung S Moe
*Assistant Examiner*—Kerri M Rose
(74) *Attorney, Agent, or Firm*—Arent Fox LLP

(57) ABSTRACT

A circuit for synchronizing symbols of a received OFDM signal includes a unit configured to detect cross-correlation of a received signal to generate a value of the cross-correlation, a unit configured to obtain synchronous summation of the value of the cross-correlation performed at predetermined intervals, a unit configured to obtain received electric power of the received signal, an autocorrelation electric power obtaining unit configured to obtain autocorrelation electric power of the received signal, a threshold obtaining unit configured to obtain a synchronous summation threshold responsive to the received electric power, and a symbol timing detecting unit configured to identify timing of a peak of the synchronous summation as symbol timing in response to detecting, at the timing of the peak, that the autocorrelation electric power is smaller than the received electric power multiplied by a predetermined factor and that the synchronous summation is larger than the synchronous summation threshold.

2 Claims, 12 Drawing Sheets

FIG.5

| RECEIVED ELECTRIC POWER P | P>=0.1 | 0.1>P>=0.01 | 0.01>P>=0.001 | 0.001>P>=0.0001 | 0.0001>P>=0.00001 | 0.00001>P |
|---|---|---|---|---|---|---|
| SYNCHRONOUS SUMMATION THRESHOLD | 0.11 | 0.037 | 0.011 | 0.0025 | 0.0015 | 0.0004 |
| MOVING AVERAGE THRESHOLD | 0.014 | 0.0087 | 0.0034 | 0.00098 | 0.00034 | 0.00005 |

CIRCUIT FOR SYNCHRONIZING SYMBOLS OF OFDM SIGNAL

CROSS-REFERENCE TO RELATED APPLICATIONS

The present application is based upon and claims the benefit of priority from the prior Japanese Patent Application No. 2004-105974 filed on Mar. 31, 2004, with the Japanese Patent Office, the entire contents of which are incorporated herein by reference.

BACKGROUND OF THE INVENTION

1. Field of the Invention

The present invention generally relates to symbol synchronizing circuits for synchronizing symbols of received signals, and particularly relates to a symbol synchronizing circuit for synchronizing symbols of received OFDM signals.

2. Description of the Related Art

In the OFDM (orthogonal frequency division multiplex) transmission, carrier waves that are arranged at constant frequency intervals and orthogonal to each other are subjected to digital modulation at symbol frequency, thereby achieving the allocation of data. Modulation and demodulation in the OFDM are achieved by performing the IFFT with respect to a plurality of symbol data items at the transmission end, and by performing the FFT with respect to the received signal at the reception end. To this end, the reception apparatus needs to detect the window timing at which the FFT is applied to the received signal. This necessitates highly accurate detection of symbol timing with respect to the OFDM symbols.

FIG. 1 is an illustrative drawing showing the format of a preamble portion of an OFDM signal according to IEEE802.1a. As shown in FIG. 1, the beginning of a frame is provided with 10 short training symbols $t_1$-$t_{10}$ that are identical to each other and arranged at a predetermined interval (a 16-data-sample length, which is referred to as a symbol sample interval), followed by a guard interval GI2 of a 32-data-sample length and long training symbols $T_1$ and $T_2$ that are identical to each other and 64-data-sample long. In order to detect the symbol timing of OFDM symbols, it suffices to detect the timing of an end of $t_{10}$, i.e., the timing of an end of the short-training-symbol portion.

FIG. 2 is a block diagram showing the construction of a related-art apparatus for detecting symbol timing. The construction shown in FIG. 2 is disclosed in Non-patent Document 1, and includes a symbol timing detecting unit 10, an A/D converter 11, and a signal detecting unit 12. The symbol timing detecting unit 10 includes a matched filter 13, an autocorrelation electric power computing unit 14, a synchronous summation unit 15, a moving average unit 16, and a symbol-start detecting unit 17. The A/D converter 11 performs A/D conversion on the received OFDM signal for provision to the signal detecting unit 12, the matched filter 13, and the autocorrelation electric power computing unit 14. The matched filter 13 performs a matched-filter process on the signal supplied from the A/D converter 11 based on a signal waveform supplied from a known-signal memory circuit, which stores therein a signal waveform identical to that of a short training symbol. As a result, the output of the matched filter 13 ends up having a peak at the boundary of each short training symbol. This output signal is subjected to synchronous summation performed at symbol-sample intervals by the synchronous summation unit 15, and is also subjected, on a separate path, to the generation of moving averages by the moving average unit 16. The outcome of synchronous summation and the obtained moving averages are supplied to the symbol-start detecting unit 17, respectively. The autocorrelation electric power computing unit 14 computes the autocorrelation electric power of a signal supplied from the A/D converter 11, and supplies the computed autocorrelation electric power to the symbol-start detecting unit 17.

The symbol-start detecting unit 17 detects a provisional start point based on the outcome of synchronous summation, and makes a final determination as to the position of an end of the short-training-symbol portion by checking the levels of autocorrelation electric powers and moving averages. This achieves highly accurate detection of symbol timing with respect to OFDM symbols.

[Patent Document 1]
Japanese Patent Application Publication No. 11-168446
[None-Patent Document 1]
Tomoya Tandai, Kazumi Sato, and Minoru Namekata, "A Study of frame synchronization method for IEEE802.11a system," Proceedings of the 2002 IEICE General Conference, Mar. 7, 2002, Communication 1, p. 704

The related-art construction shown in FIG. 2 has a drawback in that it is sensitive to noise because fixed thresholds are used for the checking of levels of synchronous summations, autocorrelation electric powers, and moving averages. The synchronous detection of symbols by use of fixed thresholds suffers a significant drop in accuracy, especially in a multi-path configuration where multi-path delay waves are superimposed on a received signal, thereby creating large fluctuation in received electric power. Since the multi-path configuration is almost always required in the field of radio communication, some countermeasures need to be devised to prevent receivers from suffering a significant drop in their performance.

As a measure to cope with the fluctuation of a received signal level in the multi-path environment, there is a technology (Patent Document 1) that changes a threshold for use in checking when detecting a null period in a set of synchronous symbols based on received-signal electric power. Such a change in the threshold is made in response to the moving average of received-signal electric power. This technology, however, is only directed to the threshold-based checking of signal electric power, and is silent about synchronous detection based on other signals. That is, only the threshold of signal electric power used at the time of null-period detection is adjusted based on the signal electric power itself, and there is no teaching or suggestion of threshold-based checking using other signals. This technology thus cannot be applied to the OFDM format as shown in FIG. 1.

Accordingly, there is a need for an OFDM symbol synchronizing circuit which achieves highly accurate threshold-based checking of a plurality of signals in the synchronizing of OFDM symbols.

SUMMARY OF THE INVENTION

It is a general object of the present invention to provide an OFDM symbol synchronizing circuit that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an OFDM symbol synchronizing circuit particularly pointed out in the specification in such full, clear, concise, and exact terms as to enable a person having ordinary skill in the art to practice the invention.

To achieve these and other advantages in accordance with the purpose of the invention, the invention provides a circuit for synchronizing symbols of a received OFDM signal, the circuit including a cross-correlation detecting unit configured to detect cross-correlation of a received signal to generate a value of the cross-correlation, a synchronous summation unit configured to obtain synchronous summation of the value of the cross-correlation performed at predetermined intervals, a received electric power obtaining unit configured to obtain received electric power of the received signal, an autocorrelation electric power obtaining unit configured to obtain autocorrelation electric power of the received signal, a threshold obtaining unit configured to obtain a synchronous summation threshold responsive to the received electric power, and a symbol timing detecting unit configured to identify timing of a peak of the synchronous summation as symbol timing in response to detecting, at the timing of the peak, that the autocorrelation electric power is smaller than the received electric power multiplied by a predetermined factor and that the synchronous summation is larger than the synchronous summation threshold.

According to another aspect of the invention, a circuit for synchronizing symbols of a received OFDM signal includes a cross-correlation detecting unit configured to detect cross-correlation of a received signal to generate a value of the cross-correlation, a synchronous summation unit configured to obtain synchronous summation of the value of the cross-correlation performed at predetermined intervals, a moving average unit configured to obtain a moving average of the value of the cross-correlation, a received electric power obtaining unit configured to obtain received electric power of the received signal, a threshold obtaining unit configured to obtain a synchronous summation threshold and a moving average threshold that are responsive to the received electric power, and a symbol timing detecting unit configured to identify timing of a peak of the synchronous summation as symbol timing in response to detecting, at the timing of the peak, that the moving average is smaller than the moving average threshold and that the synchronous summation is larger than the synchronous summation threshold.

According to another aspect of the invention, a circuit for synchronizing symbols includes a received electric power obtaining unit configured to obtain received electric power of a received OFDM signal, a threshold obtaining unit configured to obtain thresholds responsive to the received electric power, and a symbol timing detecting unit configured to detect symbol timing in response to comparison of said thresholds with detection-purpose signals used for detecting timing of an end of a short training sequence of the received OFDM signal.

According to at least one embodiment of the invention, thresholds are changed in response to the received electric power when detecting the timing of OFDM symbols by checking the levels of a synchronous summation and at least one of a moving average and an autocorrelation electric power. Namely, the thresholds dynamically adjusted in response to the received electric power are used for checking the levels of signals that are different from the received electric power. This makes it possible to achieve highly accurate detection of symbol timing even if the received electric power fluctuates due to a noise created by the influence of multi-paths or the like.

BRIEF DESCRIPTION OF THE DRAWINGS

Other objects and further features of the present invention will be apparent from the following detailed description when read in conjunction with the accompanying drawings, in which:

FIG. 1 is an illustrative drawing showing the format of a preamble portion of an OFDM signal according to IEEE802.1a;

FIG. 5 is a chart showing an example of a threshold-value table;

DESCRIPTION OF THE PREFERRED EMBODIMENTS

In the following, embodiments of the present invention will be described with reference to the accompanying drawings.

Figure 3:
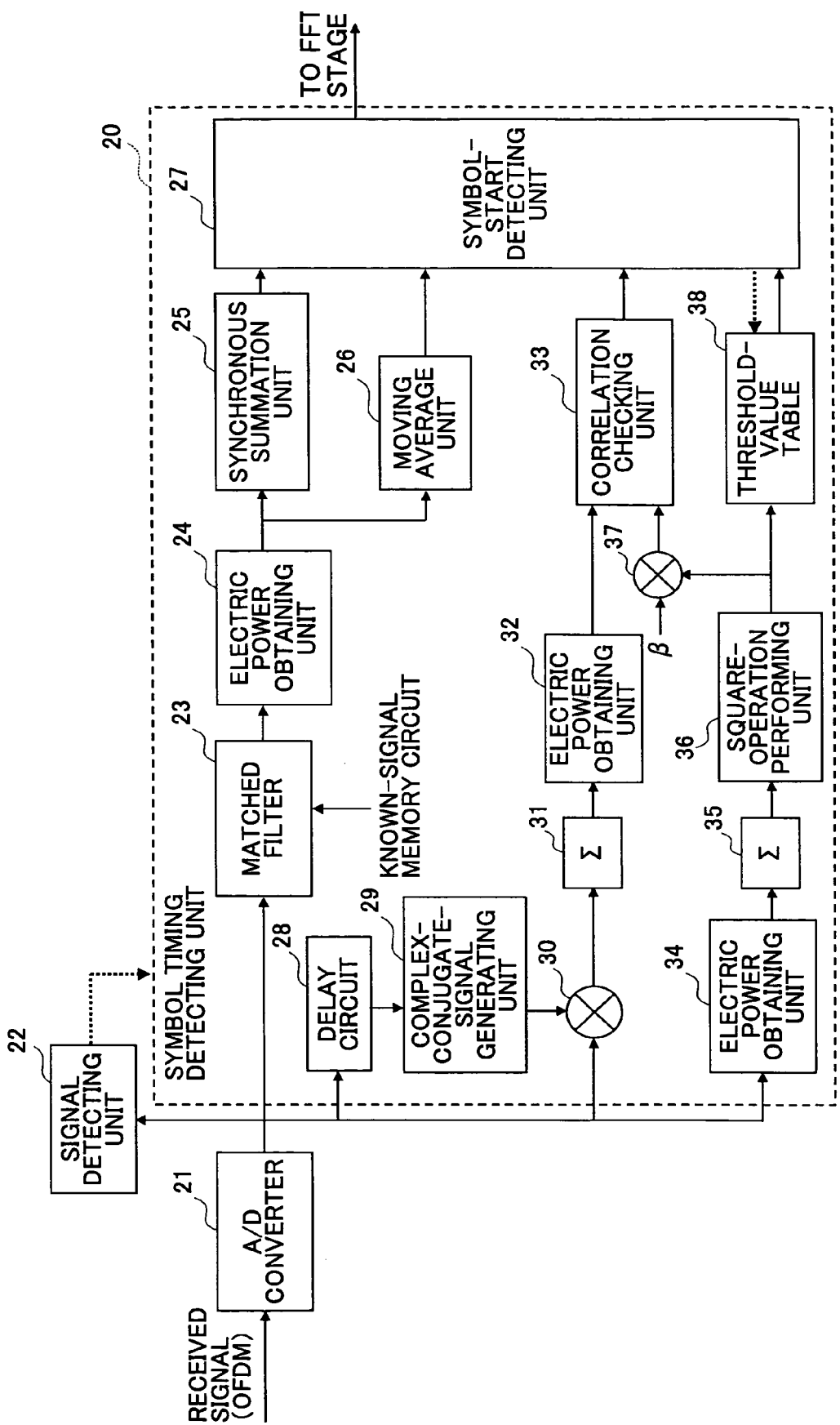
FIG. 3 is a block diagram showing a first embodiment of an apparatus for detecting symbol timing according to the invention.

FIG. 3 is a block diagram showing a first embodiment of an apparatus for detecting symbol timing according to the invention. The construction shown in FIG. 3 includes a symbol timing detecting unit 20, an A/D converter 21, and a signal detecting unit 22. The symbol timing detecting unit 20 includes a matched filter 23, an electric power obtaining unit 24, a synchronous summation unit 25, a moving average unit 26, a symbol-start detecting unit 27, a delay circuit 28, a complex-conjugate-signal generating unit 29, a complex-number multiplying unit 30, an integrating unit 31, an electric power obtaining unit 32, a correlation checking unit 33, an electric power obtaining unit 34, an integrating unit 35, and a square-operation performing unit 36, a coefficient multiplying unit 37, and a threshold-value table 38. The A/D converter 21 performs A/D conversion on the received OFDM signal for provision to the signal detecting unit 22, the matched filter 23, the delay circuit 28, the complex-conjugate-signal generating unit 29, the complex-number multiplying unit 30, and the electric power obtaining unit 34. The signal detecting unit 22 detects a packet based on the supplied signal to outputs a signal indicative of the arrival of a packet.

The matched filter 23 performs a matched-filter process (detecting cross-correlation) on the signal supplied from the A/D converter 21 based on a signal waveform supplied from a known-signal memory circuit, which stores therein a signal waveform identical to that of a short training symbol. The electric power obtaining unit 24 obtains the electric power of a signal having undergone the matched-filter process (i.e., obtains the square of a signal envelope). With this provision, the output of the electric power obtaining unit 24 ends up having a sharp peak at the boundary of each short training symbol. This output signal is subjected to synchronous summation performed at symbol-sample intervals by the synchronous summation unit 25, and is also subjected, on a separate path, to the generation of moving averages by the moving average unit 26. The outcome of synchronous summation and the obtained moving averages are supplied to the symbol-start detecting unit 27, respectively.

The delay circuit 28 delays the signal supplied from the A/D converter 21 by a delay length equal to a symbol sample period. The complex-conjugate-signal generating unit 29 obtains a complex conjugate of the delayed signal for outputting to the complex-number multiplying unit 30. The complex-number multiplying unit 30 multiplies the delayed complex conjugate signal by the signal with no delay from the A/D converter 21, thereby generating an autocorrelation signal. The autocorrelation signal is integrated over a predetermined time period by the integrating unit 31, and is then converted into electric power by the electric power obtaining unit 32. Consequently, an autocorrelation signal electric power is obtained.

The electric power obtaining unit 34 obtains the electric power of a signal supplied from the A/D converter 21. The signal converted into electric power is integrated by the integrating unit 35 over the same period as by the integrating unit 31, followed by a square operation carried out by the square-operation performing unit 36. Since the received signal is squared twice along the path on which an autocorrelation electric power is computed, the square-operation performing unit 36 provides a matching dimension by obtaining the square of a signal after the signal is converted into electric power by the electric power obtaining unit 34. Consequently, a received electric power is obtained.

The coefficient multiplying unit 37 multiplies the received electric power by a predetermined coefficient $\beta$ (greater than 0 and smaller than 1) for provision to the correlation checking unit 33. The correlation checking unit 33 compares the autocorrelation electric power supplied from the electric power obtaining unit 32 with the received electric power multiplied by the coefficient $\beta$, thereby supplying a signal indicative of which one is greater to the symbol-start detecting unit 27. The threshold-value table 38 stores entries in a table format, which are comprised of thresholds for synchronous summations and thresholds for moving averages associated with respective received electric powers. The threshold-value table 38 picks a threshold for a synchronous summation and a threshold for a moving average that correspond to the level of received electric power, and supplies these thresholds to the symbol-start detecting unit 27. The symbol-start detecting unit 27 detects the end of a short training symbol sequence as symbol timing, based on the synchronous summations supplied from the synchronous summation unit 25, the moving averages supplied from the moving average unit 26, the autocorrelation electric power check value supplied from the correlation checking unit 33, and the synchronous summation threshold and the moving average threshold supplied from the threshold-value table 38.

Figure 4:
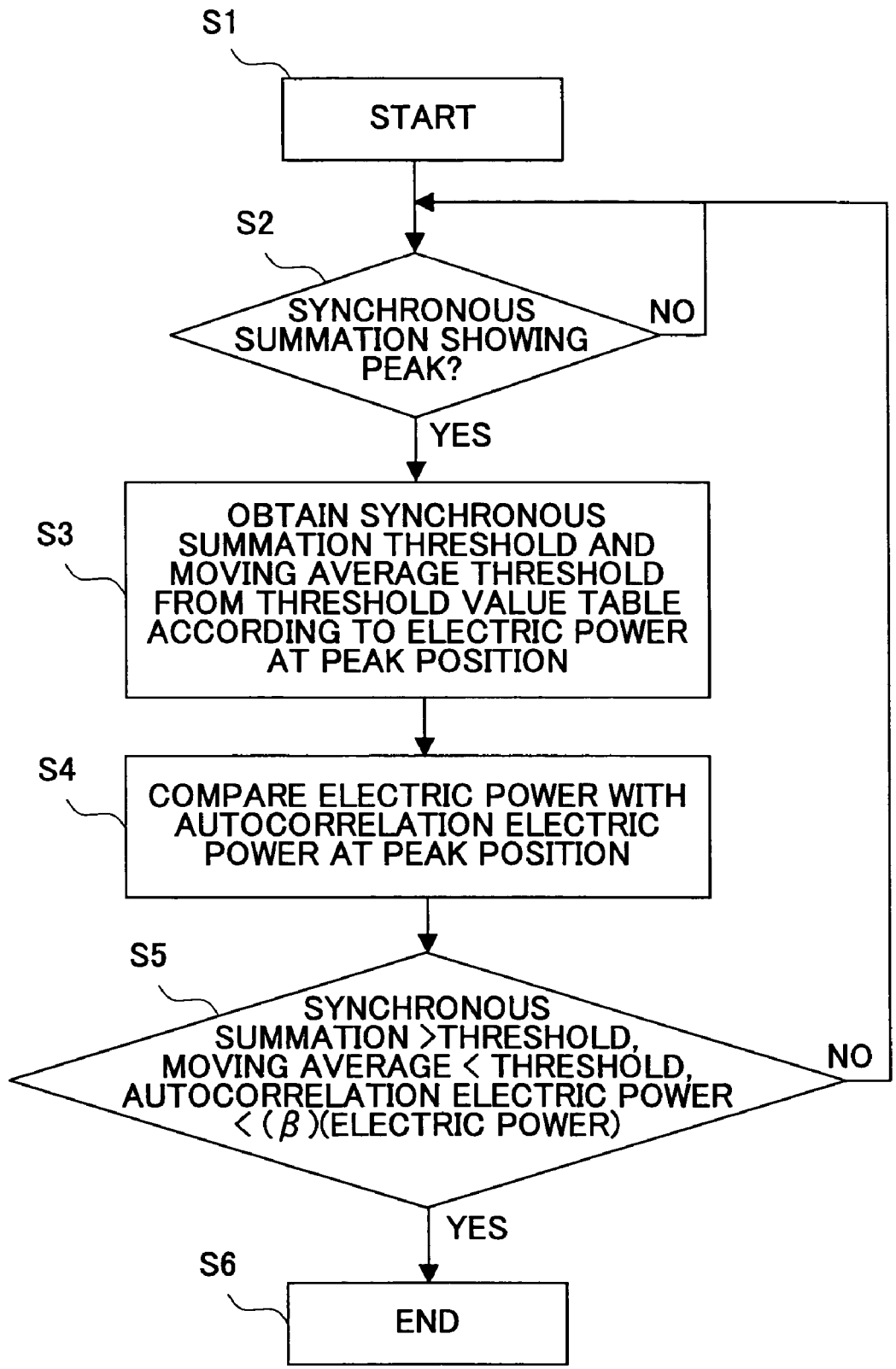
FIG. 4 is a flowchart of a symbol timing detecting operation performed by a symbol-start detecting unit.

FIG. 4 is a flowchart of a symbol timing detecting operation performed by the symbol-start detecting unit 27. A symbol-start operation starts at step S1. At step S2, a check is made as to whether synchronous summation has reached its peak. As previously described, synchronous summations are obtained by calculating synchronous summation at symbol-sample intervals with respect to a signal that has a sharp peak at the boundary of each short training symbol. As a result, the synchronous summations have sharp peaks whose height progressively increases with time. Such a peak is detected at step S2.

At step S3, a synchronous summation threshold and a moving average threshold are determined based on the electric power observed at the peak position. It should be noted that a synchronous summation threshold and a moving average threshold corresponding to the electric power received at the present moment are supplied from the threshold-value table 38. It thus suffices to use the synchronous summation threshold and the moving average threshold that are supplied at the timing of the peak position.

At step S4, electric power and autocorrelation are compared with each other at the peak position of synchronous summation. Specifically, a check result indicative of which one of the autocorrelation electric power and the received electric power multiplied by $\beta$ is larger at the present moment is supplied from the correlation checking unit 33. It thus suffices to use the check result that is supplied at the timing of the peak position.

At step S5, a check is made as to whether predetermined conditions are satisfied, i.e., a first condition requiring that the synchronous summation is larger than the synchronous summation threshold, a second condition requiring that the moving average is smaller than the moving average threshold, and a third condition requiring that the autocorrelation electric power is smaller than the received electric power multiplied by $\beta$. If all the conditions are satisfied, it is ascertained that the current peak position is symbol timing. At step S6, the symbol timing detecting process comes to an end. If any one of the conditions is not met, the procedure goes back to step S2, and, then, the following steps are repeated.

In the first embodiment of the invention as described above, thresholds are changed in response to received electric power when the timing of OFDM symbols is to be detected by checking the levels of synchronous summations, moving averages, and autocorrelation electric power. This makes it possible to achieve highly accurate detection of symbol timing even when noise due to the influence of multi-paths or the like causes received electric power to fluctuate.

FIG. 5 is a chart showing an example of a threshold-value table. As shown in FIG. 5, the threshold-value table stores synchronous summation thresholds and moving average thresholds corresponding to each range of received electric power P. As the received electric power increases, the synchronous summation threshold and the moving average threshold increase. FIG. 5 shows only an example, and the breadth of each range of received electric power P and the values of thresholds may be changed at the time of actual implementation by taking into account actual requirements.

Figure 6:
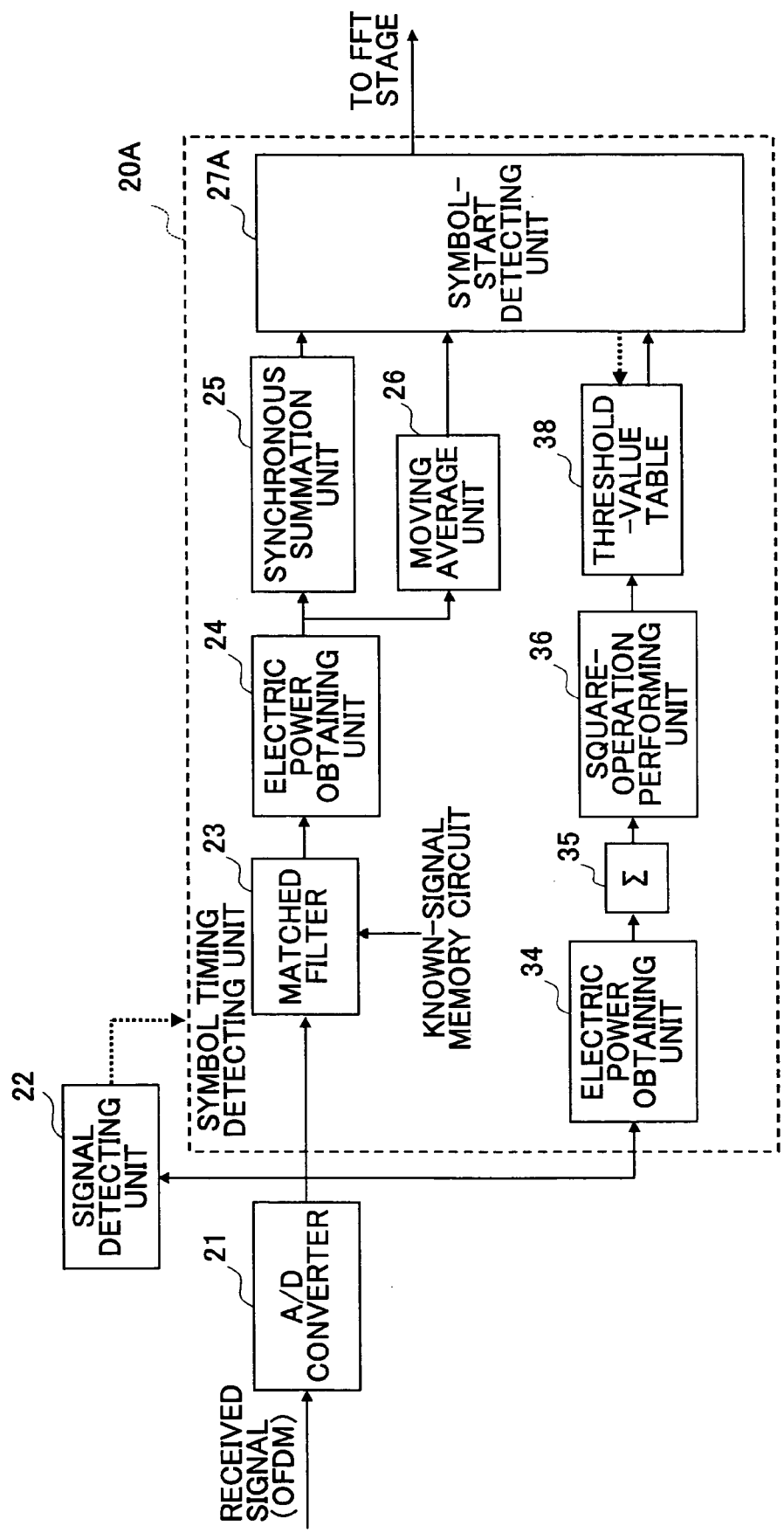
FIG. 6 is a block diagram showing a variation of the first embodiment of the symbol timing detecting apparatus according to the invention.

FIG. 6 is a block diagram showing a variation of the first embodiment of the symbol timing detecting apparatus according to the invention. In FIG. 6, the same elements as those of FIG. 3 are referred to by the same numerals, and a description thereof will be omitted. In the first embodiment shown in FIG. 3, each of synchronous summations, moving averages, and autocorrelation electric powers is checked for the purpose of detecting symbol timing by using respective thresholds responsive to received electric power. In the variation shown in FIG. 6, on the other hand, only synchronous summations and moving averages are checked for the purpose of detecting symbol timing.

A symbol timing detecting unit 20A shown in FIG. 6 is constructed by removing the delay circuit 28, the complex-conjugate-signal generating unit 29, the complex-number multiplying unit 30, the integrating unit 31, the electric power obtaining unit 32, the correlation checking unit 33, and the coefficient multiplying unit 37 from the symbol timing detecting unit 20 of FIG. 3. A symbol-start detecting unit 27A detects the end of a short training symbol sequence as symbol timing based on synchronous summations supplied from the synchronous summation unit 25, moving averages supplied from the moving average unit 26, and synchronous summation thresholds and moving average thresholds supplied from the threshold-value table 38.

Specifically, as in the construction shown in FIG. 3, a check is made as to whether synchronous summations have reached a peak. Then, a synchronous summation threshold and a moving average threshold that are supplied at the timing of the peak are identified. Based on the identified thresholds, a check is made as to whether predetermined conditions are satisfied, i.e., one condition requiring that the synchronous summation is larger than the synchronous summation threshold, and the other condition requiring that the moving average is smaller than the moving average threshold. If all the conditions are satisfied, it is ascertained that the current peak position is proper symbol timing.

In this manner, symbol timing may properly be detected by using only synchronous summations and moving averages, rather than using all of the synchronous summations, moving averages, and autocorrelation electric powers. Accuracy may drop in this case. There is an advantage, however, in that the circuit construction is simplified.

Figure 7:
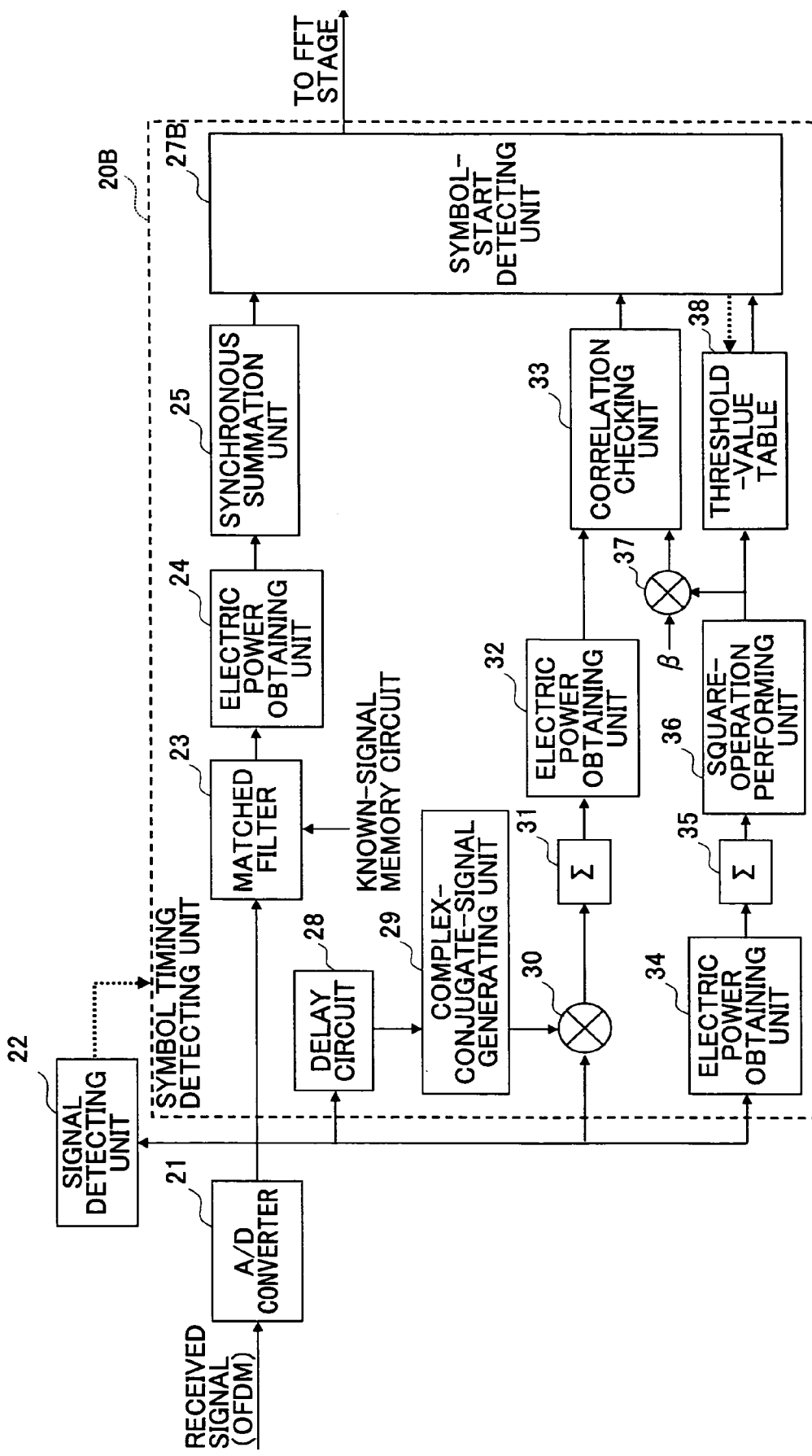
FIG. 7 is a block diagram showing another variation of the first embodiment of the symbol timing detecting apparatus according to the invention.

FIG. 7 is a block diagram showing another variation of the first embodiment of the symbol timing detecting apparatus according to the invention. In FIG. 7, the same elements as those of FIG. 3 are referred to by the same numerals, and a description thereof will be omitted. In the variation shown in FIG. 7, only synchronous summations and autocorrelation electric powers are used in the check for detecting symbol timing.

A symbol timing detecting unit 20B shown in FIG. 7 is constructed by removing the moving average unit 26 from the symbol timing detecting unit 20 of FIG. 3. A symbol-start detecting unit 27B detects the end of a short training symbol sequence as symbol timing based on synchronous summations supplied from the synchronous summation unit 25, a check result of autocorrelation electric power supplied from the correlation checking unit 33, and synchronous summation thresholds supplied from the threshold-value table 38.

Specifically, as in the construction shown in FIG. 3, a check is made as to whether synchronous summations have reached a peak. Then, a synchronous summation threshold and a check result of autocorrelation electric power that are supplied at the timing of the peak are identified. Based on these, a check is made as to whether predetermined conditions are satisfied, i.e., one condition requiring that the synchronous summation is larger than the synchronous summation threshold, and the other condition requiring that the autocorrelation electric power is smaller than the received electric power multiplied by β. If all the conditions are satisfied, it is ascertained that the current peak position is proper symbol timing.

In this manner, symbol timing may properly be detected by using only synchronous summations and autocorrelation electric powers, rather than using all of the synchronous summations, moving averages, and autocorrelation electric powers. Accuracy may drop in this case. There is an advantage, however, in that the circuit construction is simplified.

Figure 8:
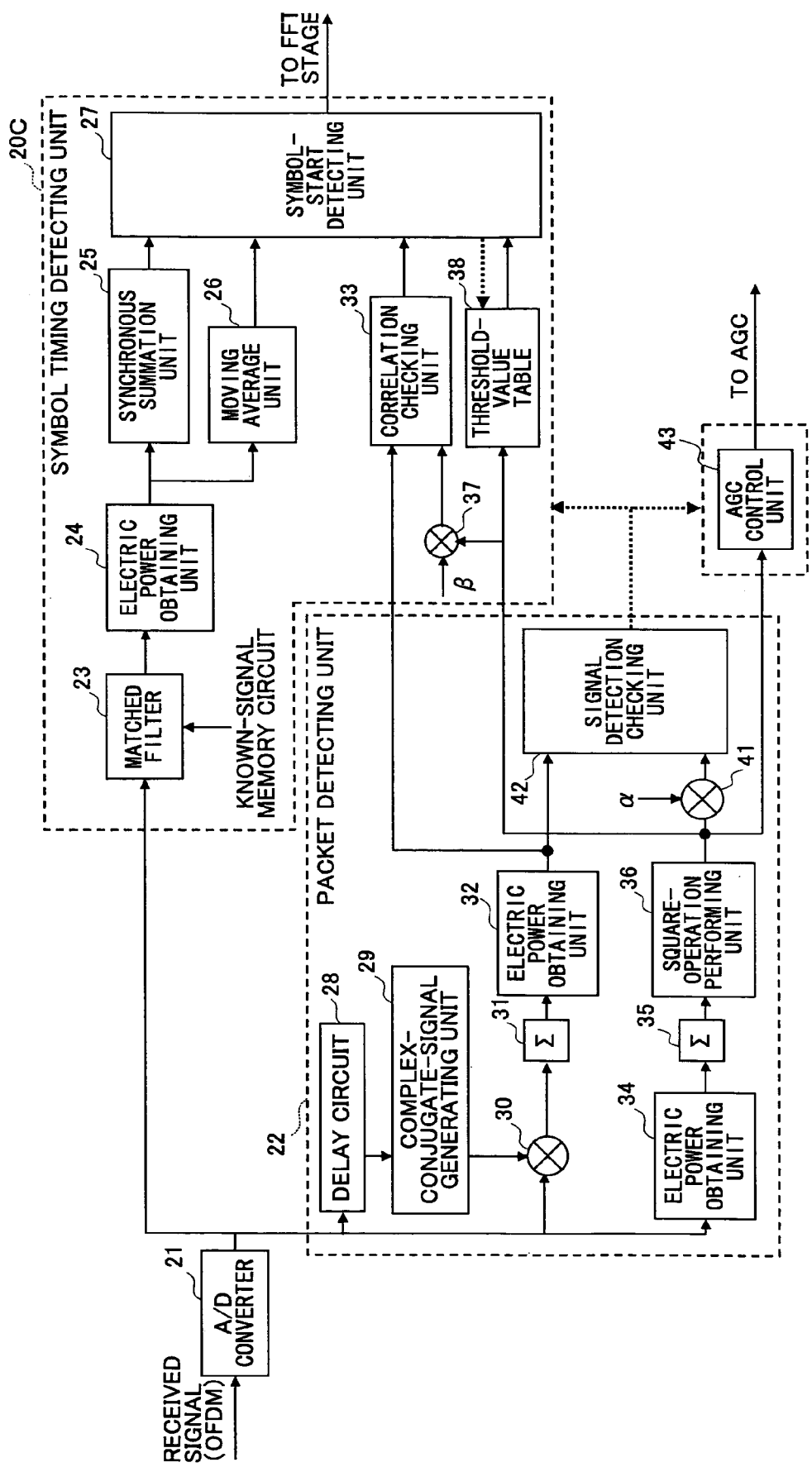
FIG. 8 is a block diagram showing a second embodiment of the symbol timing detecting apparatus according to the invention.

FIG. 8 is a block diagram showing a second embodiment of the symbol timing detecting apparatus according to the invention. In FIG. 8, the same elements as those of FIG. 3 are referred to by the same numerals, and a description thereof will be omitted. In the first embodiment shown in FIG. 3, the signal detecting unit 22 detects a packet, and outputs a packet detection signal. This packet detection process is generally performed by checking autocorrelation electric power by use of a threshold. The second embodiment of the invention achieves sharing of a common circuit portion between the signal detecting unit (packet detecting unit) and the symbol timing detecting unit, thereby achieving reduction in circuit size.

In the construction shown in FIG. 8, a symbol timing detecting unit 20C includes the matched filter 23, the electric power obtaining unit 24, the synchronous summation unit 25, the moving average unit 26, the symbol-start detecting unit 27, the correlation checking unit 33, the coefficient multiplying unit 37, and the threshold-value table 38. There are circuit units that are included in the symbol timing detecting unit 20 of FIG. 3 but not in the symbol timing detecting unit 20C of FIG. 8, i.e., the delay circuit 28, the complex-conjugate-signal generating unit 29, the complex-number multiplying unit 30, the integrating unit 31, the electric power obtaining unit 32, the electric power obtaining unit 34, the integrating unit 35, and the square-operation performing unit 36. These units are included in the signal detecting unit 22. In addition to the units listed above, the signal detecting unit 22 includes a coefficient multiplying unit 41 and a signal detection checking unit 42.

The signal detection checking unit 42 receives an autocorrelation electric power computed as in the first embodiment from the electric power obtaining unit 32. Moreover, a received electric power computed as in the first embodiment is supplied to the signal detection checking unit 42 after multiplication by a predetermined coefficient α by the coefficient multiplying unit 41. The signal detection checking unit 42 ascertains packet detection when the autocorrelation electric power stays greater than the received electric power multiplied by α for a predetermined time period, thereby asserting a packet detection signal. The packet detection signal is supplied to an AGC control unit 43 as well as to the symbol timing detecting unit 20C. The AGC control unit 43 attends to auto gain control based on the packet detection signal and the received electric power supplied from the square-operation performing unit 36.

Symbol timing detection performed by the symbol-start detecting unit 27 of the symbol timing detecting unit 20C is the same as that of the first embodiment.

The second embodiment as described above achieves sharing of a common circuit portion between the signal detecting unit 22 for packet detection and the symbol timing detecting unit 20 for symbol timing detection, thereby reducing circuit size and power consumption. Moreover, the same advantage is provided for the AGC control unit.

Figure 9:
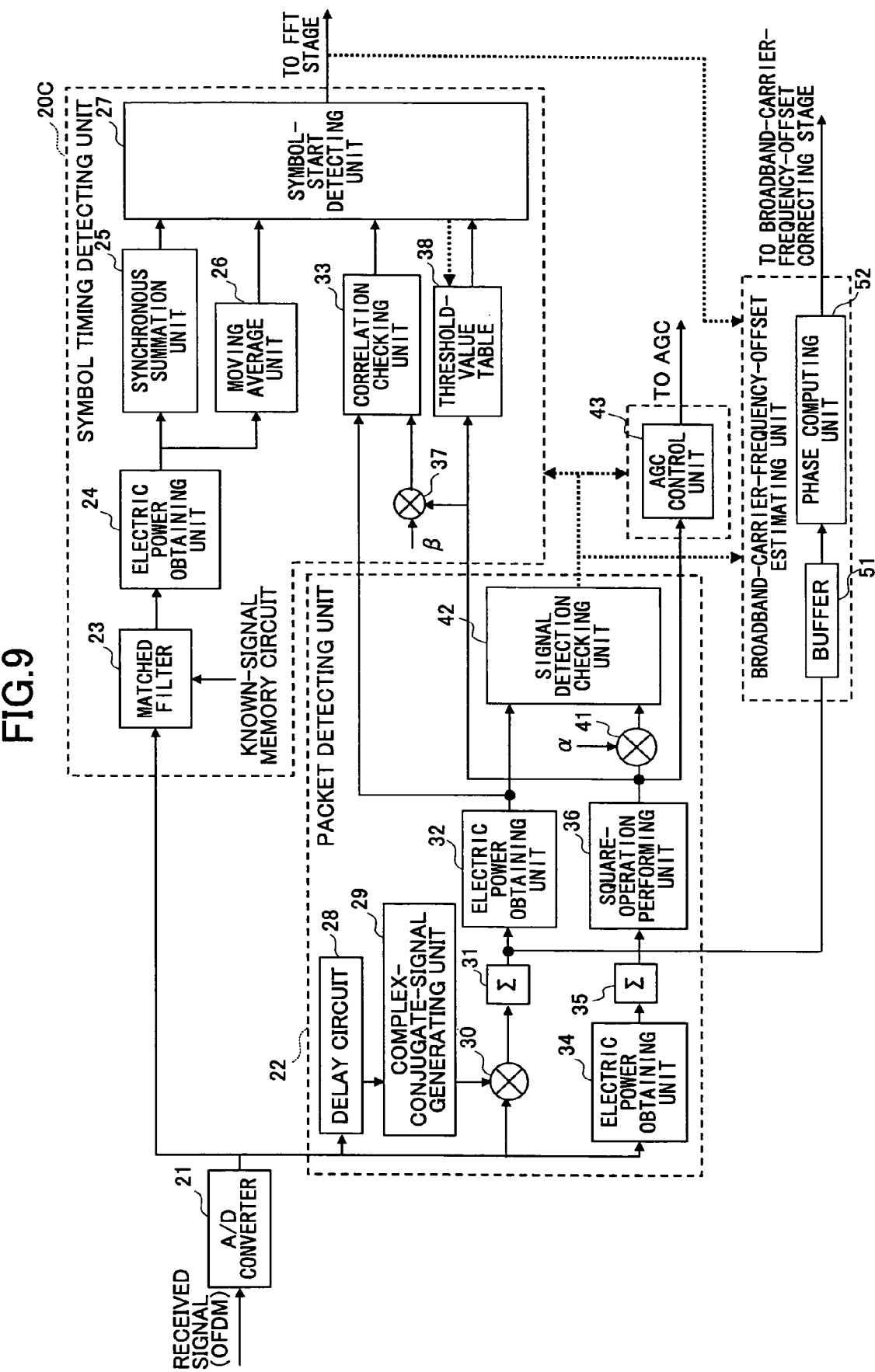
FIG. 9 is a block diagram showing a third embodiment of the symbol timing detecting apparatus according to the invention.

FIG. 9 is a block diagram showing a third embodiment of the symbol timing detecting apparatus according to the invention. In FIG. 9, the same elements as those of FIG. 8 are referred to by the same numerals, and a description thereof will be omitted.

In the OFDM, an autocorrelation value is used in the estimation of an offset of broadband carrier frequencies. The third embodiment shown in FIG. 9 achieves sharing of a circuit portion for computing an autocorrelation value between the signal detecting unit 22 of the second embodiment and a broadband-carrier-frequency-offset estimating unit. In the construction shown in FIG. 9, the broadband-carrier-frequency-offset estimating unit includes a buffer 51 and a phase computing unit 52. After packet detection, the autocorrelation value output from the integrating unit 31 of the signal detecting unit 22 is supplied to the buffer 51 concurrently with the activation of AGC control and a symbol timing detecting operation. After the symbol timing detecting operation detects a symbol start, the phase computing unit 52 of the broadband-carrier-frequency-offset estimating unit is activated so as to obtain a carrier frequency offset.

In this manner, the third embodiment achieves sharing of a common circuit portion between the signal detecting units 22 for packet detection and the broadband-carrier-frequency-offset estimating unit, thereby reducing circuit size. Further, processing in the broadband-carrier-frequency-offset estimating unit may be carried out concurrently with symbol timing detection and AGC control, thereby shortening a latency in the estimation of a broadband-carrier-frequency offset.

Figure 10A:
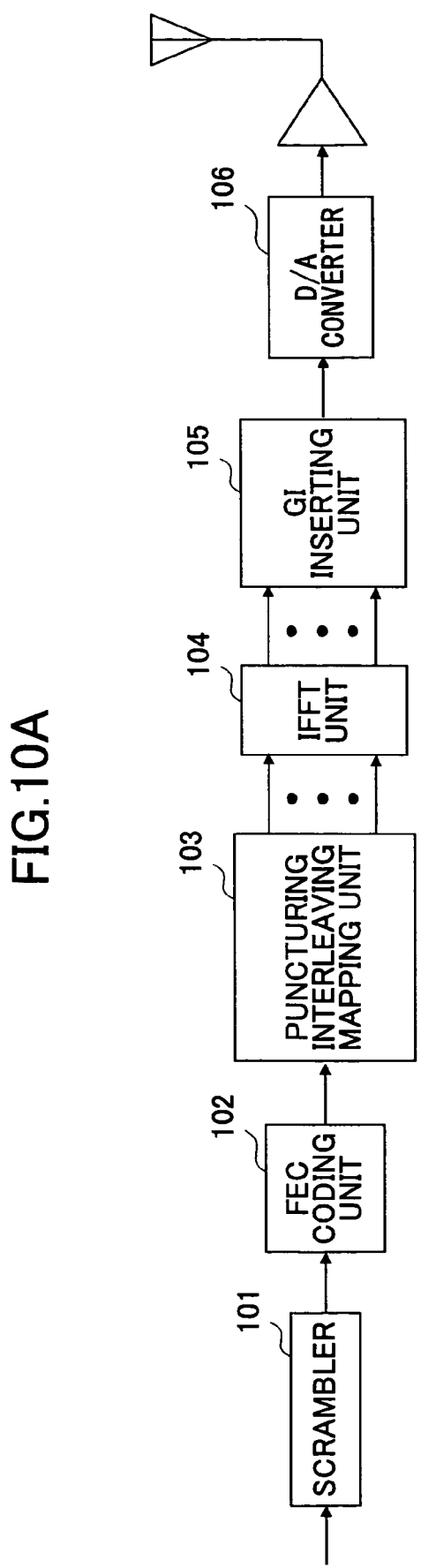
FIGS. 10A and 10B are block diagrams showing the construction of an OFDM transceiver system to which a symbol synchronizing circuit for detecting symbol timing is applied according to the invention.
Figure 10B:
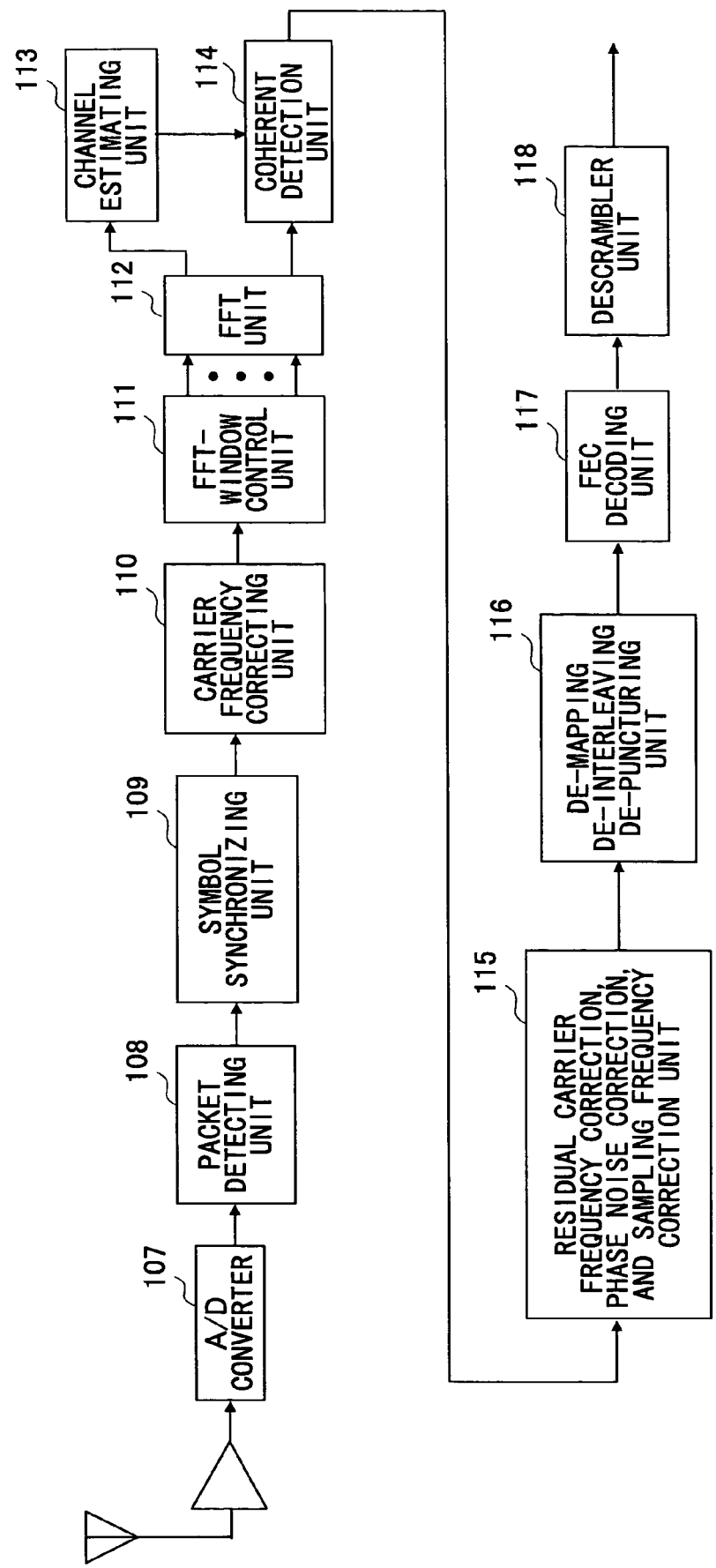

FIGS. 10A and 10B are block diagrams showing the construction of an OFDM transceiver system to which a symbol synchronizing circuit for detecting symbol timing is applied according to the invention.

As shown in FIG. 10A, a transmitter processes transmission data and generates a transmission signal by use of a scrambler 101, a FEC (forward error correction) coding unit 102, a puncturing interleaving mapping unit 103, an IFFT unit 104, a GI inserting unit 105, and a D/A converter 106. The transmission signal is transmitted as a radio signal from an antenna. A receiver shown in FIG. 10B processes a signal received at an antenna to reconstruct received data by use of an A/D converter 107, a packet detecting unit 108, a symbol synchronizing unit 109, a carrier frequency correcting unit 110, an FFT-window control unit 111, an FFT unit 112, a channel estimating unit 113, a synchronous detection unit 114, a residual carrier frequency correction, phase noise correction, and sampling frequency correction unit 115, a de-mapping de-interleaving de-puncturing unit 116, an FEC decoding unit 117, and a descrambler unit 118.

The symbol timing detecting unit of the invention corresponds to the symbol synchronizing unit 109. Moreover, the signal detecting unit 22 corresponds to the packet detecting unit 108. The symbol synchronizing unit 109 detects symbol timing and computes a broadband-carrier-frequency offset as described in connection with the previous embodiments. The carrier frequency correcting unit 110 corrects carrier frequencies based on the computed offset of broadband carrier frequencies. The FFT-window control unit 111 controls the window timing of an FFT process based on the detected symbol timing. The FFT unit 112 performs the FFT according to the controlled window timing.

Figure 1:
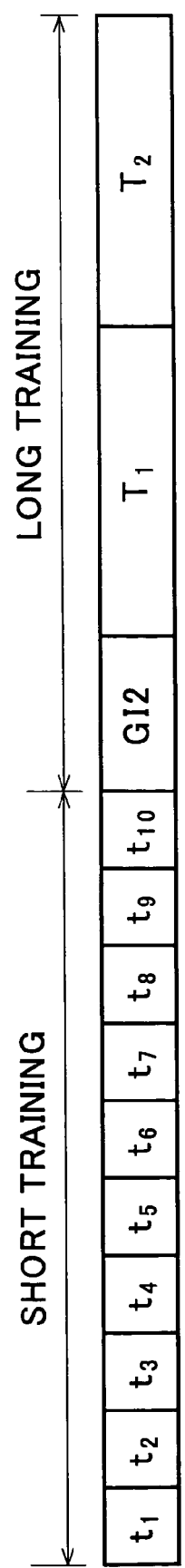
Figure 2:
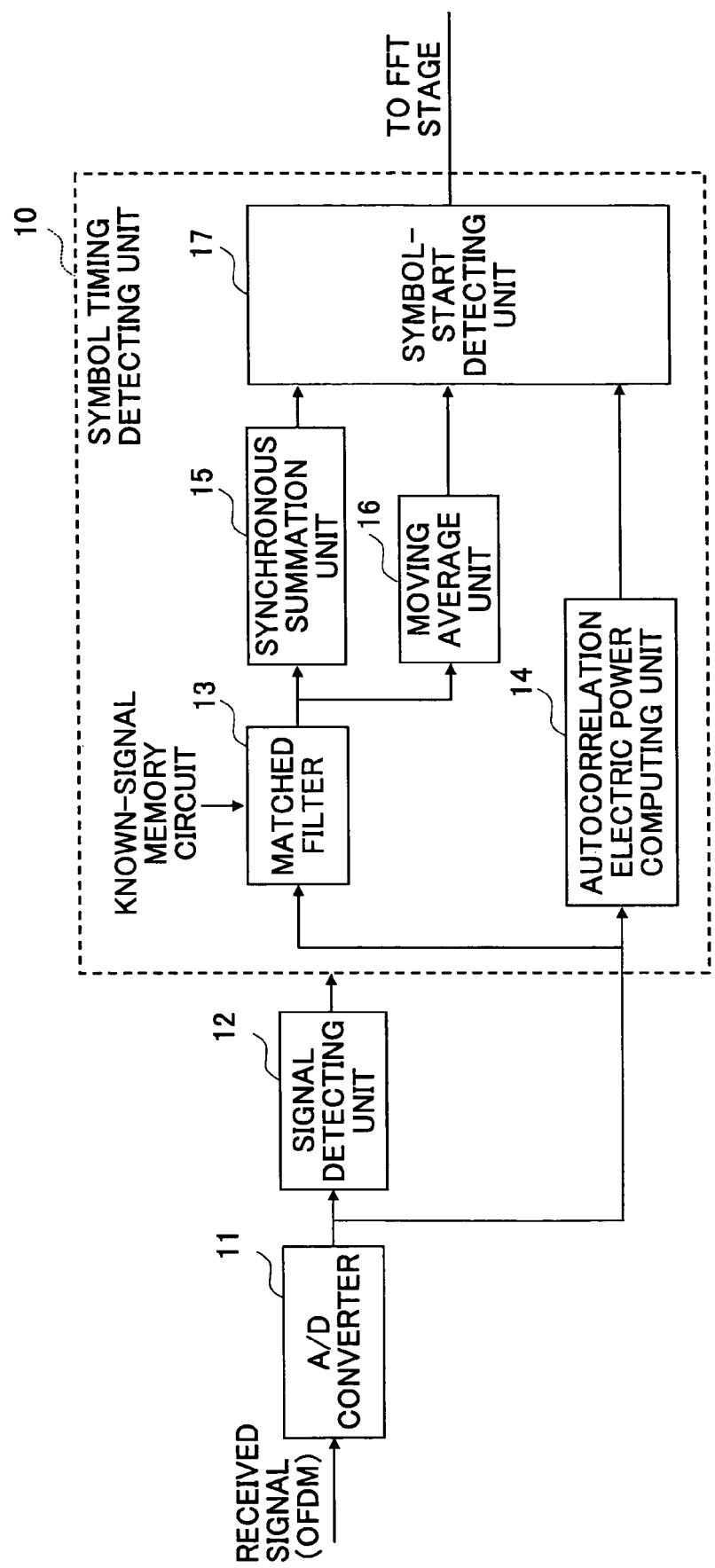
FIG. 2 is a block diagram showing the construction of a related-art apparatus for detecting symbol timing.
Figure 11:
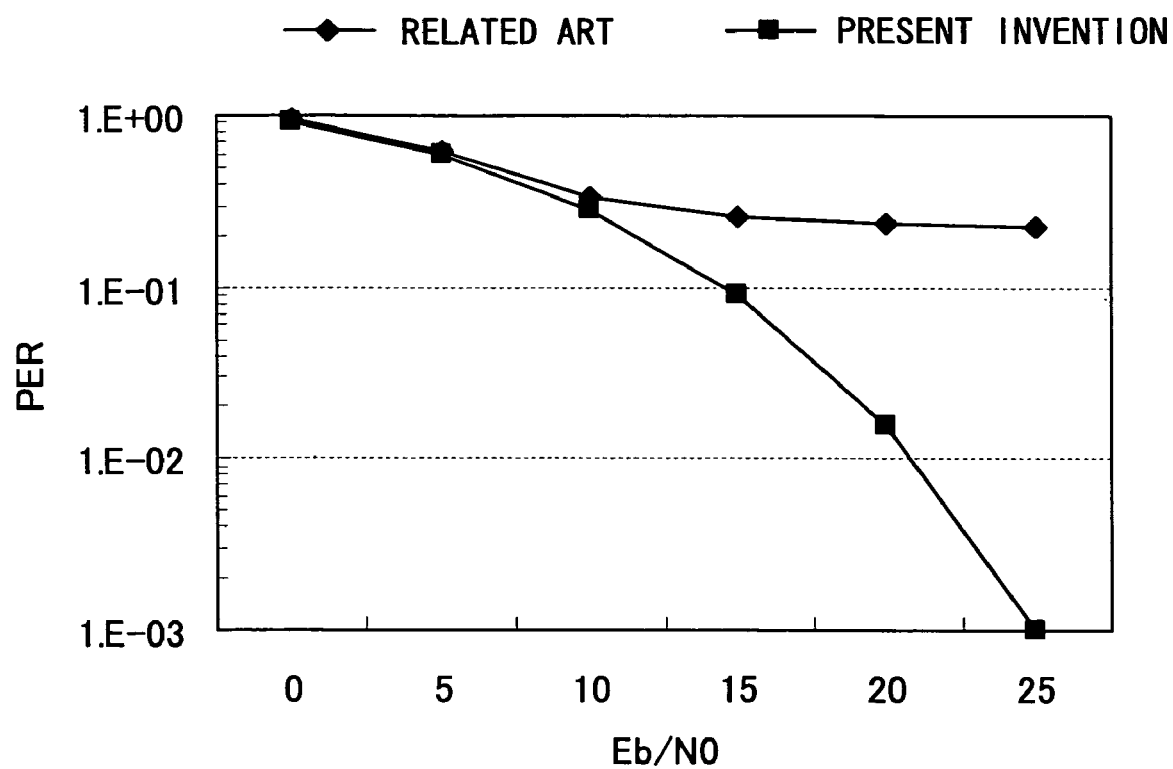
FIG. 11 is a diagram showing simulated comparison of the symbol timing detection of the invention shown in FIG. 3 with the related-art technology shown in FIG. 2.

FIG. 11 is a diagram showing simulated comparison of the symbol timing detection of the invention shown in FIG. 3 with the related-art technology shown in FIG. 2. Simulation conditions are such that six multi-paths are provided, with the average electric power of these paths decreasing exponentially. A data rate is 6 Mbps, and a packet length is 1000 bytes. In the simulation of the related-art technology shown in FIG. 2, an autocorrelation electric power threshold is 0.03, a synchronous summation threshold 0.06, and a moving average threshold 0.01, which are optimized values under the simulation conditions as described above.

The vertical axis of FIG. 11 represents a packet error rate PER, and the horizontal axis represents a ratio of energy per bit to the spectrum density of added white Gaussian noise. The smaller the PER, the fewer the reception errors. The IEEE802.11a standard prescribes that PER is 0.1 for 1000 bytes under the presence of added white Gaussian noise. There is no known standard for the multi-path configuration, but PER=0.1 may properly be used as a measure. As shown in FIG. 11, the related-art configuration keeps PER=0.1 or more regardless of noise levels in the multi-path environment, whereas the present invention can achieve PER=0 when noise is small.

Further, the present invention is not limited to these embodiments, but various variations and modifications may be made without departing from the scope of the present invention.

What is claimed is:

1. A circuit for synchronizing symbols of a received OFDM signal, comprising:
   a cross-correlation detecting unit configured to detect cross-correlation of a received signal to generate a value of the cross-correlation;
   a synchronous summation unit configured to obtain synchronous summation of the value of the cross-correlation performed at predetermined intervals;
   a received electric power obtaining unit configured to obtain received electric power of the received signal;
   an autocorrelation electric power obtaining unit configured to obtain autocorrelation electric power of the received signal;
   a threshold obtaining unit configured to obtain a synchronous summation threshold responsive to the received electric power;
   a symbol timing detecting unit configured to identify timing of a peak of the synchronous summation as symbol timing in response to detecting, at the timing of the peak, that the autocorrelation electric power obtained by the autocorrelation electric power obtaining unit is smaller than the received electric power, obtained by the received electric power obtaining unit, multiplied by a predetermined factor and that the synchronous summation is larger than the synchronous summation threshold that varies in response to the received electric power; and
   a signal detecting unit configured to output a packet detection signal in response to detecting that the autocorrelation electric power obtained by the autocorrelation electric power obtaining unit stays larger than the received electric power, obtained by the received electric power obtaining unit, multiplied by a predetermined factor for more than a predetermined time period,
   wherein said threshold obtaining unit includes a table that stores therein synchronous summation thresholds associated with respective received electric powers, and is configured to pick from the table the synchronous summation threshold associated with the received electric power for outputting therefrom.

2. The circuit as claimed in claim 1, further comprising an AGC (auto gain control) control unit configured to perform AGC control based on the packet detection signal and the received electric power obtained by said received electric power obtaining unit.

* * * * *